(12) United States Patent
Siegel

(10) Patent No.: US 6,610,935 B1
(45) Date of Patent: Aug. 26, 2003

(54) TORQUE COMPENSATED WEIGHT SENSING MODULES

(75) Inventor: Vernon Siegel, Clarence, NY (US)

(73) Assignee: Sieco, Inc., Tonawanda, NY (US)

( * ) Notice: Subject to any disclaimer, the term of this patent is extended or adjusted under 35 U.S.C. 154(b) by 76 days.

(21) Appl. No.: 09/715,602

(22) Filed: Nov. 17, 2000

Related U.S. Application Data

(60) Provisional application No. 60/166,019, filed on Nov. 17, 1999.

(51) Int. Cl.$^7$ .................................. G01G 3/08
(52) U.S. Cl. .................... 177/211; 177/229; 73/862.633
(58) Field of Search ................ 177/211, 229; 73/862.633, 862.634, 862.638, 862.639

(56) References Cited

U.S. PATENT DOCUMENTS

| | | | |
|---|---|---|---|
| 3,439,761 A | 4/1969 | Laimins | 177/211 |
| 3,602,866 A | 8/1971 | Saxl | 177/211 |
| 3,724,575 A | 4/1973 | Kutsay | 177/211 |
| 3,927,560 A | 12/1975 | Farr | 73/141 A |
| 4,411,326 A | 10/1983 | Siegel | 177/211 |
| 4,420,985 A | 12/1983 | Raskin | 177/211 |
| 4,421,186 A * | 12/1983 | Bradley | 177/211 |
| 4,454,770 A | 6/1984 | Kistler | 73/862.65 |
| 4,482,783 A * | 11/1984 | Laimins | 177/211 |
| 4,690,230 A | 9/1987 | Uchimura et al. | 177/229 |
| 4,785,896 A * | 11/1988 | Jacobson | 177/211 |
| 4,979,580 A * | 12/1990 | Lockery | 177/211 |
| 5,119,894 A | 6/1992 | Crawford et al. | 177/145 |
| 5,183,125 A | 2/1993 | Schurr | 177/211 |
| 5,190,116 A * | 3/1993 | Reichow | 177/211 |
| 5,230,252 A * | 7/1993 | O'brien et al. | 177/211 |
| 5,391,844 A | 2/1995 | Johnson et al. | 177/229 |
| 5,393,938 A | 2/1995 | Bumbalough | 177/144 |
| 5,510,581 A | 4/1996 | Angel | 177/211 |
| 5,610,343 A * | 3/1997 | Eger et al. | 177/211 |
| 5,837,946 A * | 11/1998 | Johnson et al. | 177/211 |
| 5,892,180 A | 4/1999 | Carey | 177/144 |

* cited by examiner

Primary Examiner—Randy W. Gibson
(74) Attorney, Agent, or Firm—Laurence S. Roach, Esq.; Jaeckle Fleischmann & Mugel, LLP

(57) ABSTRACT

A force sensing module with reduced sensitivity to torque in order to accurately measure weight in the presence of longitudinal and lateral torques, comprising two or more sensing means mounted vertically with output signal means combined and adjustable to minimize longitudinal torque response. The force sensing module further comprises a vertical support for lifting and supporting a load, a support arm coupled to the vertical support for engaging and holding a load, first and second sets of strain gauges, spaced from each other and either in vertical or horizontal alignment with each other. The strain gauges are connected at one end to the vertical support and at the other end to the arm for receiving a force proportional to the load and for receiving a torque from the arm. The force sensing module also comprises first and second Wheatstone bridges, wherein each Wheatstone bridge comprises one of the sets of strain gauges and at least one variable resistance coupled between the Wheatstone bridges with a resistors adjustable to reduce the sensitivity of the Wheatstone bridges to torque applied to the sets of strain gauges through the support arm. The force sensing modules are useful in the measurement of medical patient weights where great accuracy is required for diagnostic and treatment needs.

18 Claims, 9 Drawing Sheets

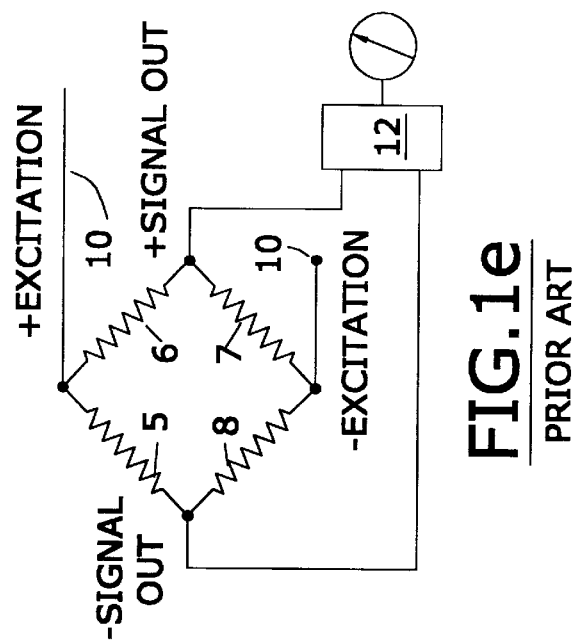
FIG.1e
PRIOR ART
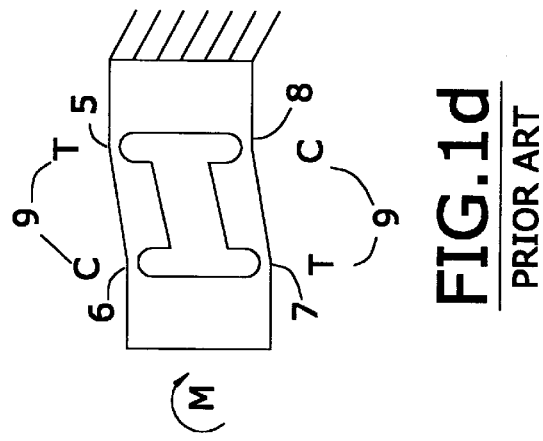
FIG.1d
PRIOR ART
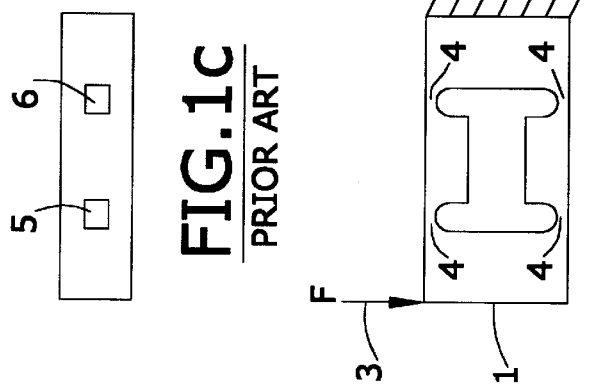
FIG.1c
PRIOR ART
FIG.1b
PRIOR ART
FIG.1a
PRIOR ART

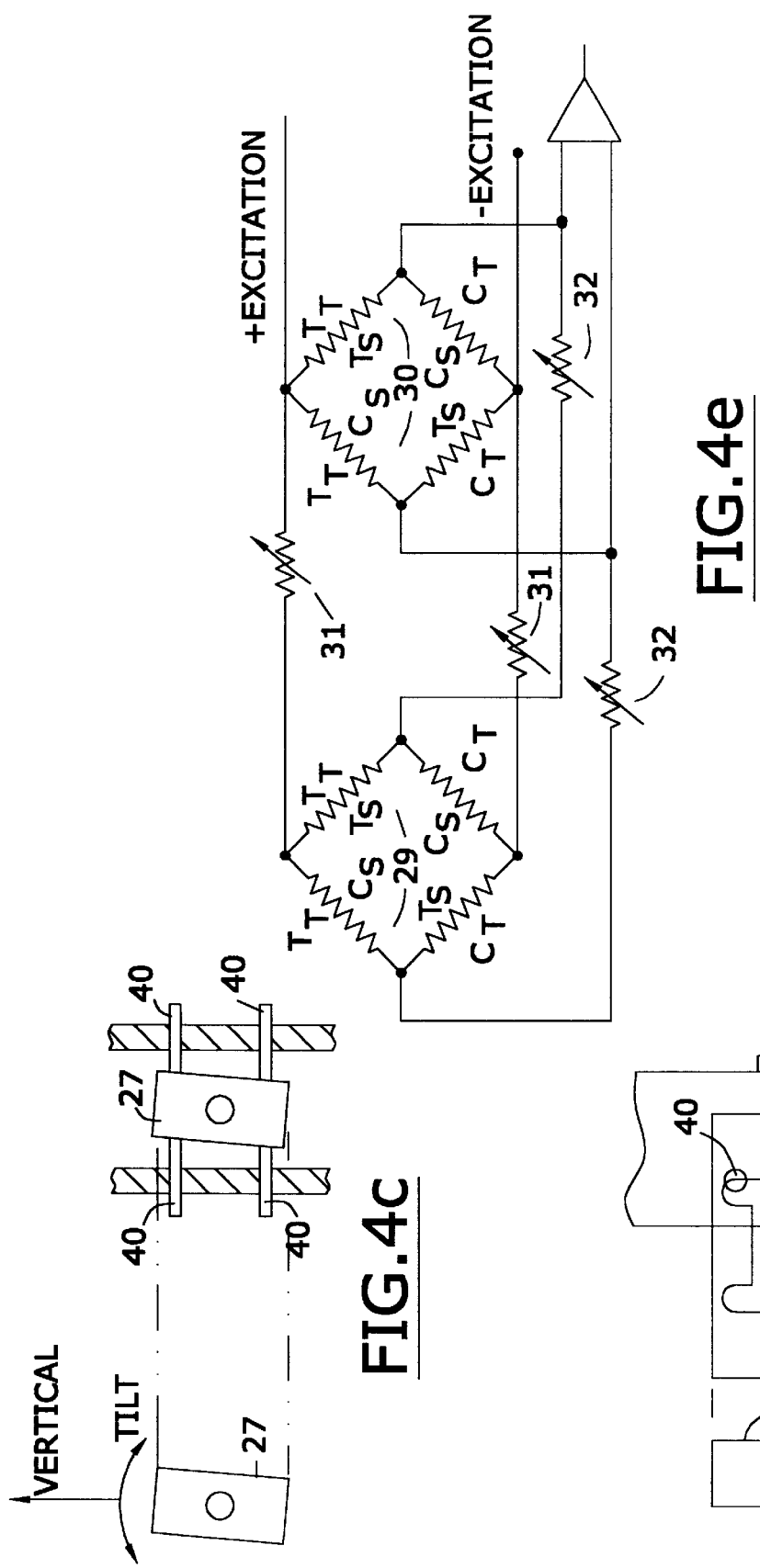

TORQUE COMPENSATED WEIGHT SENSING MODULES

CROSS-REFERENCE TO RELATED APPLICATIONS

This application claims the benefit of U.S. Provisional Patent Application No. 60/166,019, filed Nov. 17, 1999.

FIELD OF THE INVENTION

The present invention relates generally to weight sensing modules, and more particularly, to torque compensated weight sensing modules having reduced sensitivity to torque in order to accurately measure weight in the presence of longitudinal and lateral torques.

BACKGROUND OF THE INVENTION

Strain gauge transducers are widely used in weight measuring system to measure forces in scales, structures, mechanical structure, etc. The point of application of the weight is not always directly over the transducer, but may be laterally or longitudinally displaced relative to the transducer sensing axis. This results in a moment being applied to the transducer in addition to the measured shear force.

One such application is a crane arrangement is used to lift medical patients from a bed or chair and place them on a table, stool, other exam facilities, where their weights are needed for treatment purposes. The patients may be prone or upright. Their body profiles and their support harnesses produce great variation in the centers of gravity of the total masses. In addition, variable boom lengths and heights are needed to perform the position requirements. With the application of the techniques described herein, weight measurements accurate to 0.1% of weight measured are readily achieved. However, torque applied to the transducers often result in errors greater than 0.1%.

To show how torques contribute to weight inaccuracies, consider a typical strain gauge sensor or transducer depicted in prior art FIGS. 1a–1e. Please note that while a strain gauge type of sensing means is described, other sensing means employing capacitive, piezoresistive, or inductive techniques may be used. Bottom, side and top views of a metallic element (1) are shown in FIGS. 1a, 1b and 1c respectively. A weight force is applied to one end of the element and the opposite end is attached to a base or other structure. The inner section of the element is machined to produce narrowed down hinge points (4) to concentrate stresses resulting from the applied force. These stresses result in increased strains at these points and are readily measured with strain gauges (5), (6), (7), and (8). The element is deformed as shown in FIG. 1d as a result of the applied force and the tension and compression forces (9) that combine to create a moment to counteract the applied force. The strain gauge elements are conveniently connected as a Wheatstone Bridge as shown in FIG. 1e. An excitation voltage (10), either alternating or direct current voltage is applied to opposite corners of the bridge and the output signal (11) derived from the other opposite corners of the bridge are processed by an amplifier, analog to digital converter or other electronic means (12).

In practical applications, the force cannot always be applied to the end of the transducer as shown in prior art FIGS. 1a–1e. One such application is shown in prior art FIG. 2a. There, a lift mechanism raises medical patients and consists of a base (16), vertical mast (13), a moveable arm (14), sling arrangement (15), and a mechanical, electrical, or hydraulic actuator (17). In such applications, a force sensing module (18) senses the weight of the patient. The weight (19) is applied through a lever arm (20) that greatly increases the moment acting on the transducer.

Shown in prior art FIG. 2b, the transducer (21) now has a shear force (22) that is effectively applied to the end of the transducer (21) that shear force is opposed by tension stresses Ts and compressive stresses Cs. The weight (21) applied through lever arm (20) results in a moment (23) that is resisted by tension stresses Tt and compressive stresses Ct. Thus, the total stresses acting at each strain gauge is the sum of these stresses and the stress due to the moment can greatly exceed the measured stresses that are due to the shear force.

The electrical signals resulting from these stress additions are shown in prior art FIG. 2d. The signals from the shear forces (22) results in a differential (24) labeled as '+ signal out S' and '− signal out S'. The electrical signal from the moment results in a "common mode" signal (26) and (27) labeled as '− signal out T and 1 +signal out T'. Most of the common mode signal is rejected by the differential amplifier (12). However inconsistencies of manufacturing of the webs (4), strain gauge sensitivities, placement of gauges, linearity of deflections, etc. result in an output of transducer (21) that is influenced by lever arm (20). These factors influence the sensitivity of the transducers. The transducer (21) may have a calibration sensitivity that is positive or negative with respect to lever arm (20) increase. Typically this sensitivity may be in the order of ±1%.

Another moment is created when the weight applied is displaced laterally to the longitudinal as is depicted in prior art FIG. 2c. This is a top view of FIG. 2b and the weight is applied vertically (out of the paper). The result is a twist of the transducer. For some transducer designs, less sensitivity change due to the torque is obtained if the torque is applied as shown in prior art FIG. 3b as contrasted to that shown in prior art FIG. 3a. This is due to the somewhat less lever arm for the combined Ts and Tt, and Cs and Ct forces as shown in prior art FIG. 3c.

SUMMARY OF THE INVENTION

Accordingly, it is a principle object of the present to invention to provide a force sensing module, with reduced sensitivity to torque in order to accurately measure weight in the presence of longitudinal and lateral torques, comprising two or more sensing means mounted vertically with output signal means combined and adjustable to minimize longitudinal torque response. The force sensing module further comprises a vertical support for lifting and supporting a load, a support arm coupled to the vertical support for engaging and holding a load, first and second sets of strain gauges, spaced from each other and either in vertical or horizontal alignment with each other. The strain gauges are connected at one end to the vertical support and at the other end to the arm for receiving a force proportional to the load and for receiving a torque from the arm. The force sensing module also comprises first and second Wheatstone bridges, wherein each Wheatstone bridge comprises one of the sets of strain gauges and at least one variable resistance coupled between the Wheatstone bridges with a resistors adjustable to reduce the sensitivity of the Wheatstone bridges to torque applied to the sets of strain gauges through the support arm.

BRIEF DESCRIPTION OF THE DRAWINGS

FIG. 1a is a bottom plan view of a prior art strain gauge sensor or transducer;

FIG. 1b is a side view of a prior art strain gauge sensor or transducer;

FIG. 1c is a top plan view of a prior art strain gauge sensor or transducer;

FIG. 1d is a side view of the prior art strain gauge sensor or transducer depicted in FIG. 1b in a deformed state as a result of the applied force, and the tension and compression forces that combine to create a moment to counteract the applied force;

FIG. 1e is an electrical schematic of a prior art strain gauge element connected to a Wheatstone Bridge;

FIG. 4c is a top view of a position of a transducer according to one embodiment of the invention pursuant to the application of a torque;

FIG. 4d is a side view of a transducer according to one embodiment of the invention accomplishing longitudinal torque compensation with wedge shim elements;

FIG. 4e is an electrical schematic of one embodiment of how the signals from the transducers in FIGS. 4a and 4b may be combined;

DETAILED DESCRIPTION OF THE INVENTION

Referring to FIGS. 4–6, wherein like parts are designated with like numerals, there is depicted a force sensing module with reduced sensitivity to torque in order to accurately measure weight in the presence of longitudinal and lateral torques. The force sensing module comprises two or more sensing means mounted vertically with output signal means combined and adjustable to minimize longitudinal torque response.

The force sensing module further comprises a vertical support for lifting and supporting a load, a support arm coupled to the vertical support for engaging and holding a load, first and second sets of strain gauges, spaced from each other and either in vertical or horizontal alignment with each other. The strain gauges are connected at one end to the vertical support and at the other end to the arm for receiving a force proportional to the load and for receiving a torque from the arm.

The force sensing module also comprises first and second Wheatstone bridges, wherein each Wheatstone bridge comprises one of the sets of strain gauges and at least one variable resistance coupled between the Wheatstone bridges with a resistors adjustable to reduce the sensitivity of the Wheatstone bridges to torque applied to the sets of strain gauges through the support arm.

Figure 2B:
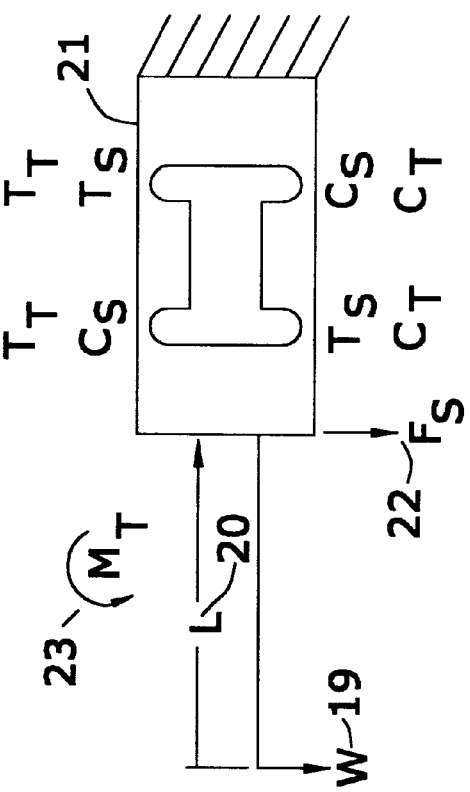
FIG. 2b is side view of a the transducer having a shear force applied to the end of the transducer and opposed by tension and compressive stresses.
Figure 2A:
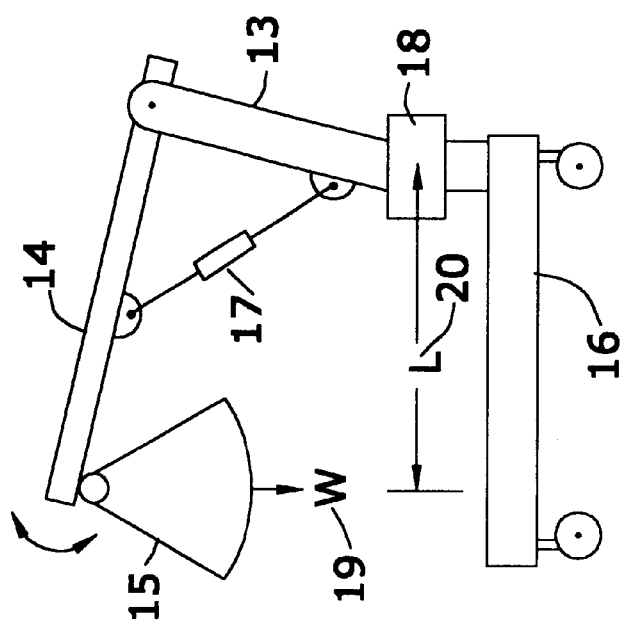
FIG. 2a is side plan view of a lift mechanism for raising medical patients.
Figure 2D:
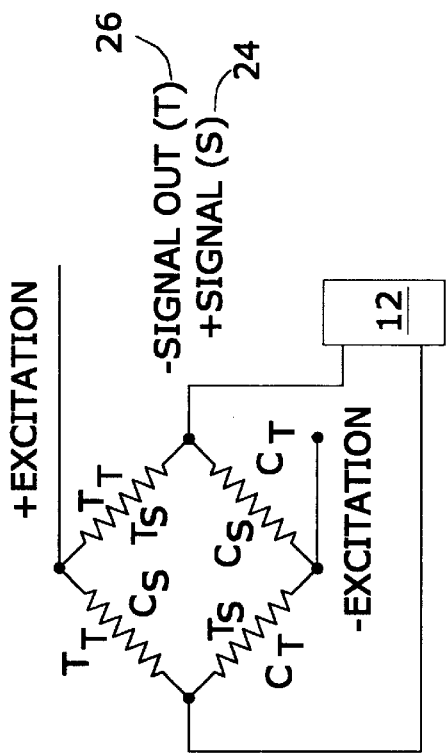
FIG. 2d is schematic of the electrical signals resulting from these stress additions depicted in FIG. 2b.
Figure 2C:
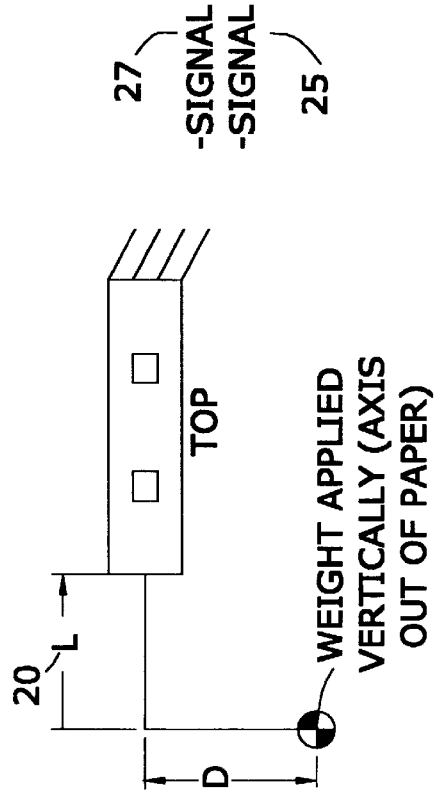
FIG. 2c is top view of the figure depicted in 2b wherein another moment is created when the weight applied is displaced laterally to the longitudinal.
Figure 3C:
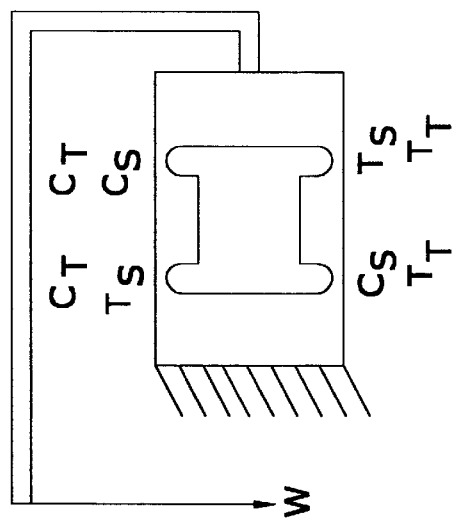
FIG. 3c is a side view of a torque applied to a transducer via a lever arm.
Figure 3B:
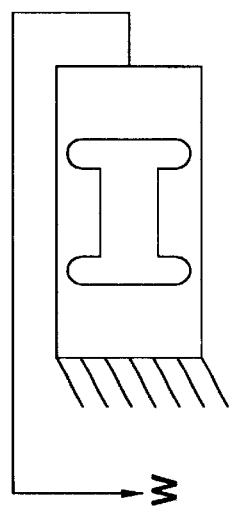
FIG. 3b is a side view of another torque applied to a transducer.
Figure 3A:
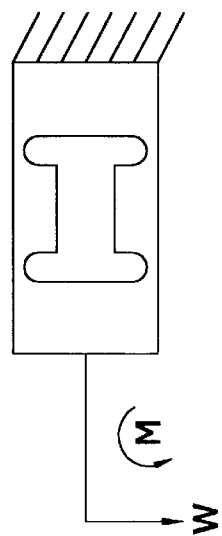
FIG. 3a is a side view of a torque applied to a transducer.
Figure 4B:
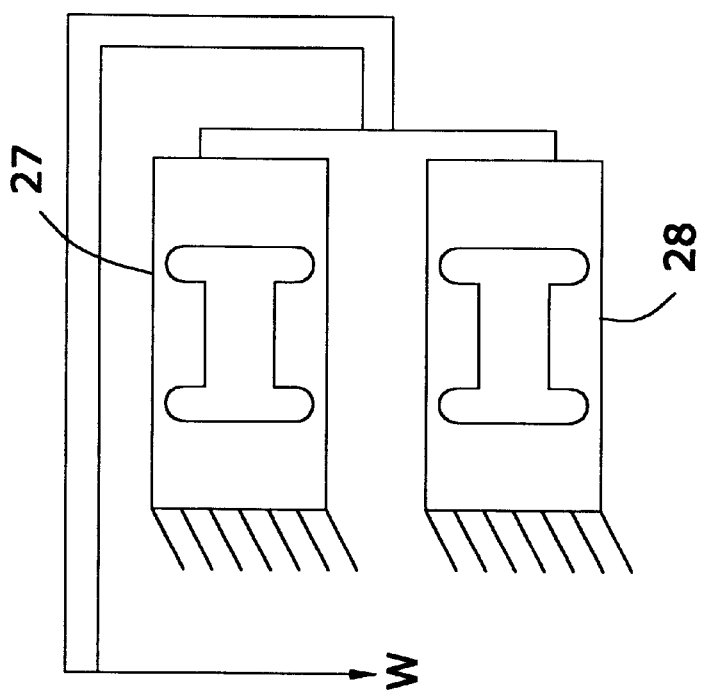
FIG. 4b is a side plan view of vertically mounted transducers in accordance with another embodiment of the present invention.
Figure 4A:
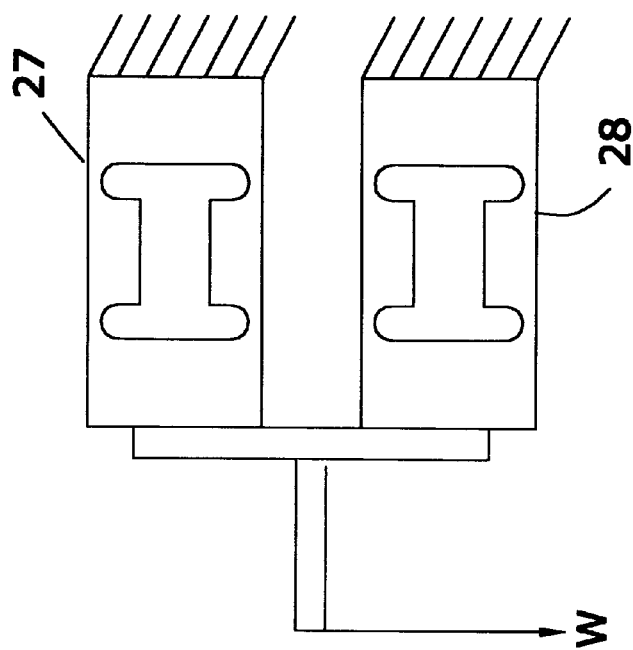
FIG. 4a is a side plan view of vertically mounted transducers in accordance with embodiment of the present invention.

An arrangement for decreasing the sensitivity shifts due to the torque applied to the transducer is shown in FIGS. 4a–4e and FIGS. 5a and 5b, for a large torque that is applied along the transducer's longitudinal axis. The arrangement of FIGS. 4a and 4b is preferred. Here transducer means (27) and (28) are mounted vertically. The transducer may be a single mechanical element, but is preferentially two or more distinct mechanical devices that are selected for uniformity. The signals from these transducers may be combined as shown in FIG. 4e. The Wheatstone Bridge (29) represents one transducer (27) and the bridge (30) represents the output from the other transducer (28). Variable resistance means (31) can be adjusted to vary excitation of bridge (29) or alternately resistance means (32) may be varied to reduce the output from bridge (29). Thus, the signal from one transducer can be varied relative to the other transducer to achieve a positive or negative correction of the combined signals to achieve a zero effect from the applied torque.

Figure 4G:
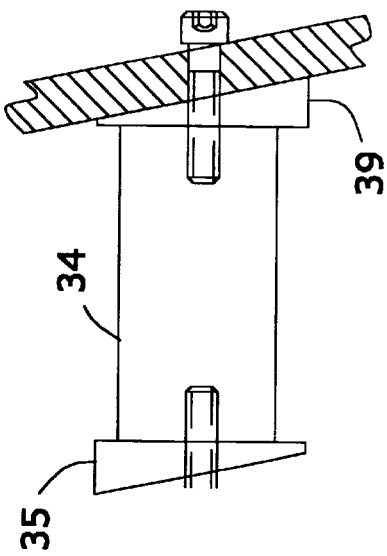
FIG. 4g is a side view of a transducer according to one embodiment the present invention adjusted and clamped with bolts.
Figure 4F:
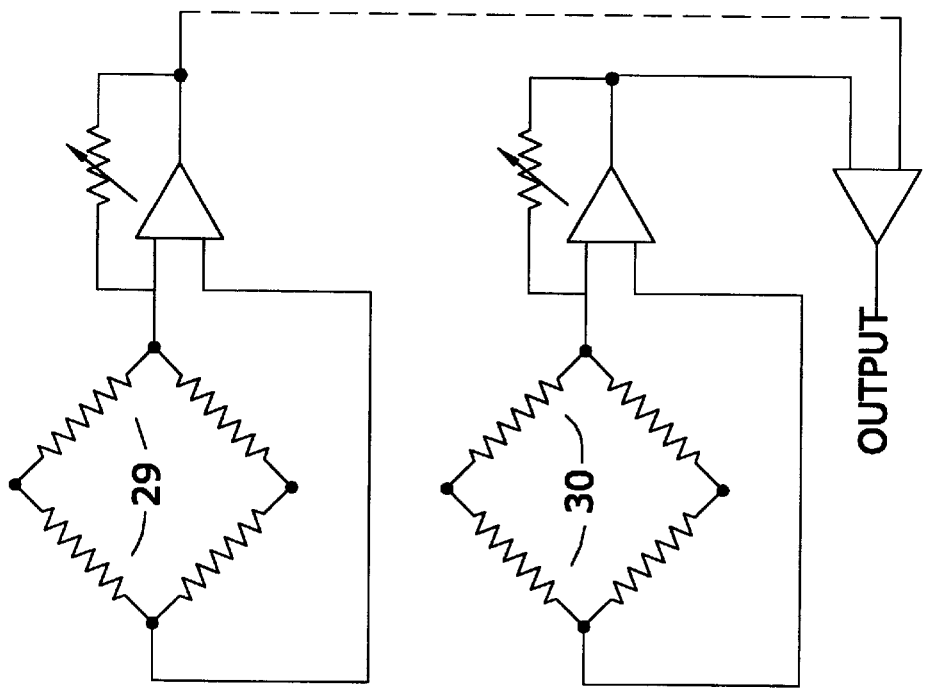
FIG. 4f is an alternative embodiment of an electrical schematic that may be used to achieve sensitivity variation.

Of course, other electrical methods such as shown in FIG. 4f may be used to achieve the sensitivity variation. If a lateral torque is present simultaneously with the longitudinal torque, this may be corrected by a slight rotation of one or more of the transducers as shown in FIGS. 4d and 4c. A possible method of accomplishing this is shown in FIG. 4g wherein the transducer is adjusted and clamped with bolts (40).

Figure 5C:
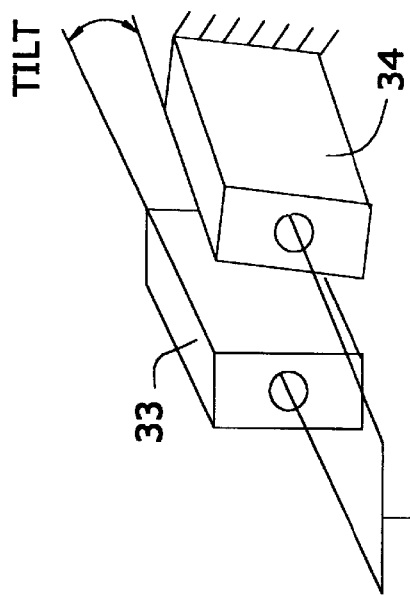
FIG. 5c is perspective view of two transducers according to one embodiment of the present invention when the longitudinal torque is of greater significance.
Figure 5A:
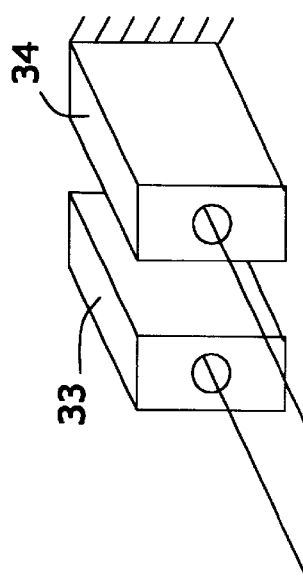
FIG. 5a is perspective view of two transducers according to one embodiment of the present invention when the lateral torque is of greater significance.

If the lateral torque is of the greater significance, the arrangement of FIG. 5a is preferred. There two or more transducers (33) and (34) are mounted side by side. It should be noted that the transducers (33) and (34) maybe a single mechanical element having laterally separated sensing means. The signals from transducers (33) and (34) are combined as shown in FIGS. 4e or 5b.

Figure 5B:
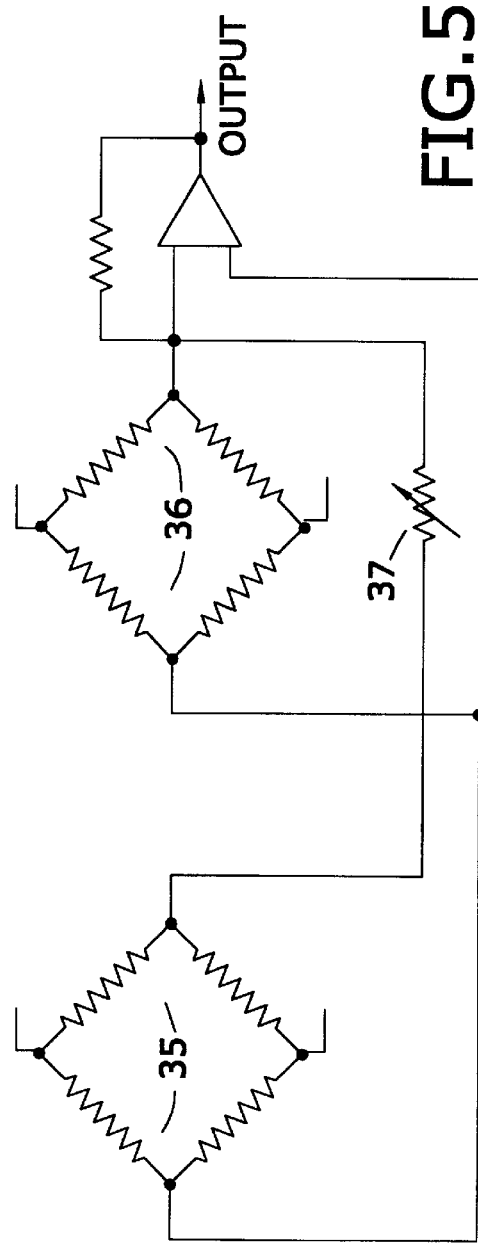
FIG. 5b is an electrical schematic view of two bridges according to one embodiment of the present invention.

In FIG. 5b, Wheatstone Bridge (35) represents transducer (33) and bridge (36) represents bridge (34). For small corrections a single resistance element (37) may be used for adjustment purposes to cancel the lateral torque effects. If longitudinal torque compensation is also needed then one or more of the transducers may be tilted in the vertical axis. This is shown in FIG. 5c and a method of accomplishing this with wedge shim elements (39) and (39) may be used as shown in FIG. 4d.

Figure 6B:
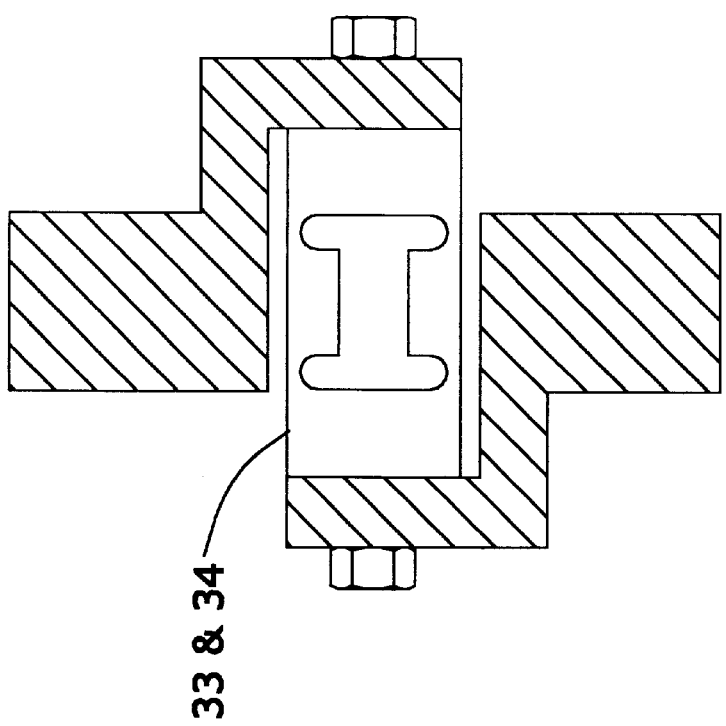
FIG. 6b is a side view according to an alternative embodiment of the present invention where a compact module can be retrofitted to existing lift mechanisms.
Figure 6A:
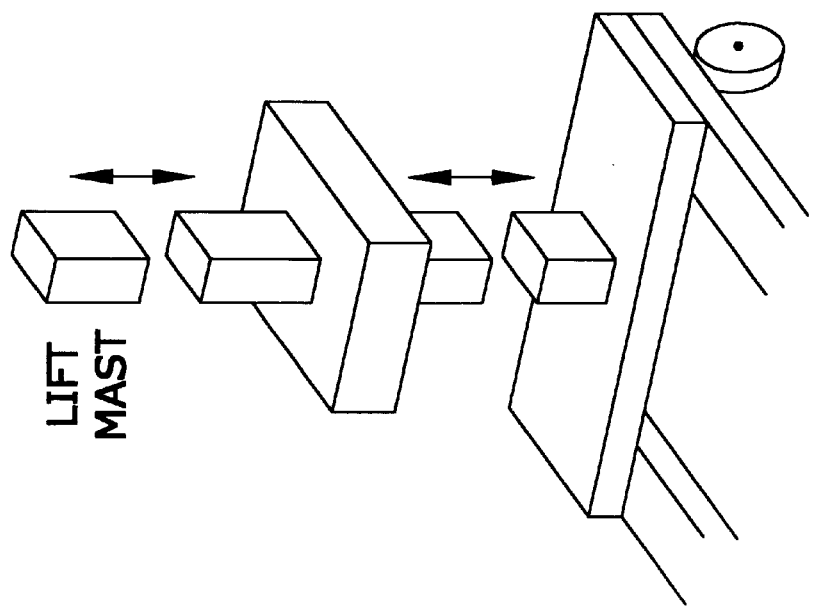
FIG. 6a is an exploded view according to one embodiment of the present invention where a compact module can be retrofitted to existing lift mechanisms.

The techniques shown are especially pertinent to the measurement of medical patient weights where great accuracy is required for diagnostic and treatment needs. This is in spite of great variations in patient weights, centers of gravity of the bodies, and lift heights and boom reach, and point of load applications. These techniques have permitted weight measurement with errors of 0.1% or less despite the stated load variations. Additionally, the techniques lend themselves to formation of compact modules that are easily retrofitted to existing lift mechanisms such as shown in FIGS. 6a and 6b. The module contains stubs that can be inserted into the tubing forming the mast of a lift mechanism. The module may be pre-tested and adjusted for minimum torque sensitivity prior to installation.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What I claim is:

1. A force sensing module for measuring weight in the presence of longitudinal and lateral torques, comprising:

at least two sets of strain gauges, said sets of strain gauges spaced apart from each other and in vertical alignment, said strain gauges configured for being connected at a first end thereof to a vertical support and at a second end thereof to an arm, each of said strain gauges thereby sensing and providing respective output signals indicative of a load on the vertical support and a torque acting on the arm; and output signal combining means combining and adjusting said output signals to minimize a longitudinal torque response.

2. The module of claim 1 wherein at least one of the sets of strain gauges can be rotated around a horizontal axis to minimize lateral torques.

3. The module of claim 1 further comprising a single mechanical element containing vertically separated and aligned independent sets of strain gauges.

4. The module of claim 1 mounted in a mast structure of a lifting device.

5. The module of claim 2 mounted in a mast structure of a lifting device.

6. The module of claim 1 packaged in a housing with one or more posts mounted into a pipe or tubing.

7. The module of claim 2 packaged in a housing with one or more posts mounted into a pipe or tubing.

8. The module of claim 1 mounted in a vertically movable lifting device.

9. The module of claim 2 mounted in a vertically movable lifting device.

10. The module of claim 4 further comprising readout means to display weight.

11. The module of claim 5 further comprising readout means to display weight.

12. A force sensing module for measuring weight in the presence of lateral torques, comprising:

at least two sets of strain gauges, said sets of strain gauges spaced apart from each other and aligned in a horizontal direction, said strain gauges configured for being connected at a first end thereof to a vertical support and at a second end thereof to an arm, each of said strain gauges thereby sensing and providing respective output signals indicative of a load on the vertical support and a torque acting on the arm; and output signal combining means combining and adjusting said output signals to minimize a lateral torque response.

13. The module of claim 12 wherein at least one of the sets of strain gauges can be rotated in a vertical plane to minimize longitudinal torques.

14. The module of claim 12 further comprising a single mechanical element having horizontally separated and aligned independent sets of strain gauges.

15. A force sensing module with reduced sensitivity to torque, comprising:

a vertical support for lifting and supporting a load;

a support arm coupled to the vertical support for engaging and holding a load;

first and second sets of strain gauges, spaced form each other either in vertical or horizontal alignment with each other, wherein the strain gauges are connected at one end to the vertical support and at the other end to the arm, each of said strain gauges receiving a force proportional to the load from said vertical support and a torque from said support arm;

first and second Wheatstone bridges, wherein each Wheatstone bridge comprises one of the sets of strain gauges, at least one variable resistance coupled between the Wheatstone bridges, said variable resistance being adjustable to reduce the sensitivity of the Wheatstone bridges to the torque applied to the sets of strain gauges through the support arm.

16. The force sensing module of claim 15 wherein outputs of the Wheatstone bridges are added to each other.

17. The force sensing module of claim 16 wherein the Wheatstone bridges comprise between one and four variable resistors, each adjustable to remove sensitivity to a torque applied to the support arm.

18. The force sensing module of claim 15 wherein at least one of the sets of strain gauges is mechanically adjustable to offset torque applied to the support arm.

* * * * *